United States Patent
Goto et al.

(10) Patent No.: US 7,789,600 B2
(45) Date of Patent: Sep. 7, 2010

(54) TIP DRESSER

(75) Inventors: Tadashi Goto, Mie (JP); Shinji Hoshino, Mie (JP)

(73) Assignee: Honda Motor Co., Ltd., Tokyo (JP)

( * ) Notice: Subject to any disclaimer, the term of this patent is extended or adjusted under 35 U.S.C. 154(b) by 189 days.

(21) Appl. No.: 11/989,797

(22) PCT Filed: Jul. 26, 2006

(86) PCT No.: PCT/JP2006/314738

§ 371 (c)(1),
(2), (4) Date: Jan. 30, 2008

(87) PCT Pub. No.: WO2007/015399

PCT Pub. Date: Feb. 8, 2007

(65) Prior Publication Data

US 2009/0279974 A1 Nov. 12, 2009

(30) Foreign Application Priority Data

Aug. 2, 2005 (JP) ............................. 2005-224494

(51) Int. Cl.
B23C 3/00 (2006.01)
B23C 5/12 (2006.01)

(52) U.S. Cl. ...................................... 409/140; 407/42
(58) Field of Classification Search ................. 409/140, 409/139, 138; 407/65, 33, 42, 47–48
See application file for complete search history.

(56) References Cited

U.S. PATENT DOCUMENTS 5,401,127 A   3/1995  Nakajima et al.
5,725,340 A * 3/1998  Nakajima et al. ........... 409/140

FOREIGN PATENT DOCUMENTS

| JP | 06-047564 | | 2/1994 |
| JP | 06-047565 | | 2/1994 |
| JP | 11-179562 A | * | 7/1999 |
| JP | 11179562 | | 7/1999 |

* cited by examiner

Primary Examiner—Erica E Cadugan
(74) Attorney, Agent, or Firm—Carrier, Blackman & Associates, P.C.; Joseph P. Carrier; William D. Blackman

(57) ABSTRACT

A tip dresser 1 dresses electrode tips 4, 5. The tip dresser 1 is rotated around a rotation axis and includes a holder 2 configured to be rotated around a rotation axis and to have concave tapers 2c, 2d, which make the rotation axis a center, on both faces of the holder 2; and a cutter 3 configured to be fixed to the holder 2 and to be protruded to sides of the electrode tips 4, 5 from the tapers 2c, 2d only at portions of the cutter 3 more inside than outer diameters D1, D2 of the electrode tips 4, 5.

1 Claim, 2 Drawing Sheets

PRIOR ART

TIP DRESSER

TECHNICAL FIELD

The present invention relates to a tip dresser for dressing an electrode tip used for a spot welding, and particularly, to a tip dresser for preventing radial runout of the electrode tip in dressing thereof.

BACKGROUND ART

Conventionally, as a tip dresser for dressing an electrode tip used for a spot welding, there exists the tip dresser that fixes a cutter to a rotating holder and cuts a top of an electrode tip.

FIG. 4 is a section drawing showing a state of an electrode tip being cut by a conventional tip dresser.

For example, as shown in FIG. 4, a tip dresser is known where a cutter 110 is fixed by a screw to a holder 100 having concave taper faces 101 on both upper and lower faces. With respect to the tip dresser, an edge portion 111 of the cutter 110 slightly protrudes from surfaces of the taper faces 101; if the holder 100 is rotated, the edge portion 111 is configured to always contact ends or corners of electrode tips 120.

But because the cutter 110 is only disposed at one place in circumferential directions of the taper faces 101, there exists, for example, a problem that: if the electrode tips 120 are attached slantingly with respect to a rotation axis (not shown) and tops of the tips 120 are displaced from the rotation axis of the holder 100, the tips 120 continue on radially swinging and a place swinging outward is excessively cut and the tips 120 are dressed into distorted forms.

Therefore, as a tip dresser for preventing the radial runout of an electrode tip, the tip dresser is also known where two cutters are provided symmetrically to the rotation axis of a holder.

DISCLOSURE OF THE INVENTION

Problem to be Solved by the Invention

However, in the tip dresser having such two cutters, if upper and lower electrode tips are the same in diameter, length, and cut amount, although a cutting resistance is balanced, there exists a problem that the radial runout of an electrode tip cannot be suppressed because in fact individual conditions are different.

The present invention has been made in view of such the background, and an object of the invention is to provide a tip dresser for preventing the radial runout of an electrode tip.

In order to solve the problem, a tip dresser of the invention is the tip dresser that dresses an electrode tip that comprises: a holder configured to be rotated around a rotation axis and to have concave tapers, which make the rotation axis a center, on both faces of the holder; and a cutter configured to be fixed to the holder and to be protruded to a side of the electrode tip from the tapers only at a portion of the cutter more inside than an outer diameter of the electrode tip. In other words, the cutter includes a cutting portion which projects into a space within the concave tapers and will engage the electrode tip when the electrode tip is inserted into one of the concave tapers, and cutter is positioned on the holder based on a size of the electrode tip to be dressed such that when the electrode tip is inserted into one of the concave tapers coaxially with the rotation axis of the holder, the cutting portion of the cutter will protrude closer to the rotation axis than does the surface of the concave taper only where the cutting portion is disposed at a distance less than or equal to a radius of the electrode tip from the rotation axis, and radial swinging movement of the electrode tip relative to the rotation axis of the holder will be suppressed by engagement of the electrode tip with the surface of the concave taper.

According to the invention, when a holder makes a rotation axis a center and rotates, and an electrode tip radially swings, an outer peripheral end of a top face of the electrode tip abuts with concave tapers; thereby, the tapers lead the electrode tip to an axial center direction; and therefore, the radial runout of the electrode tip can be suppressed. Therefore, the electrode tip is accurately cut to a preferable form as much as the radial runout is suppressed, and results in being cut as approximately an edge face of a cutting edge.

Even if a cutter fixed to the holder radially swings in cutting an end face of an electrode tip and is swung outside, because the cutter is not protruded more outside than an outer diameter of the electrode tip, it is possible to suppress a portion other than a place to be cut from being cut by the cutter.

Effect of the Invention

According to the tip dresser of the present invention, it is possible to suppress the radial runout of an electrode tip and to cut the electrode tip to a form as approximately an edge form.

DESCRIPTION OF SYMBOLS

Tip Dresser
Holder
2c, 2d Taper
Cutter
4, 5 Electrode Tip
C Axial Center (Rotation Axis)
D1, D2 Outer Diameter

BEST MODE(S) FOR CARRYING OUT THE INVENTION

Figure 1:
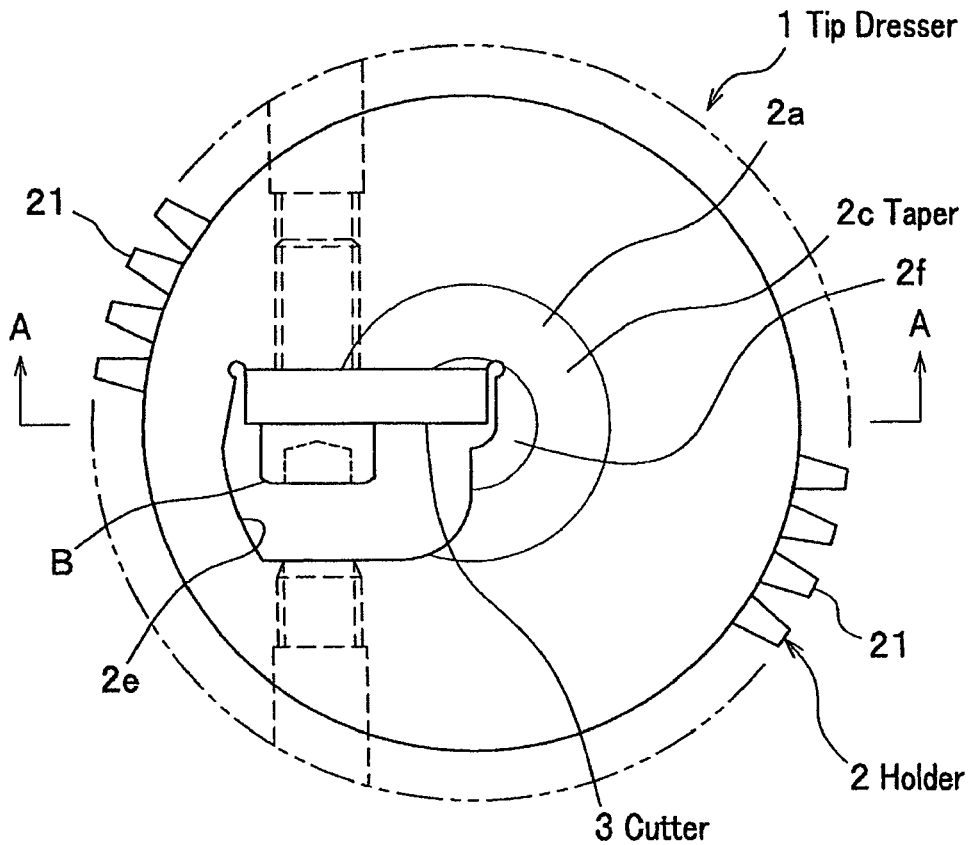
FIG. 1 is a plan view of a tip dresser relating to an embodiment of the present invention.
Figure 2:
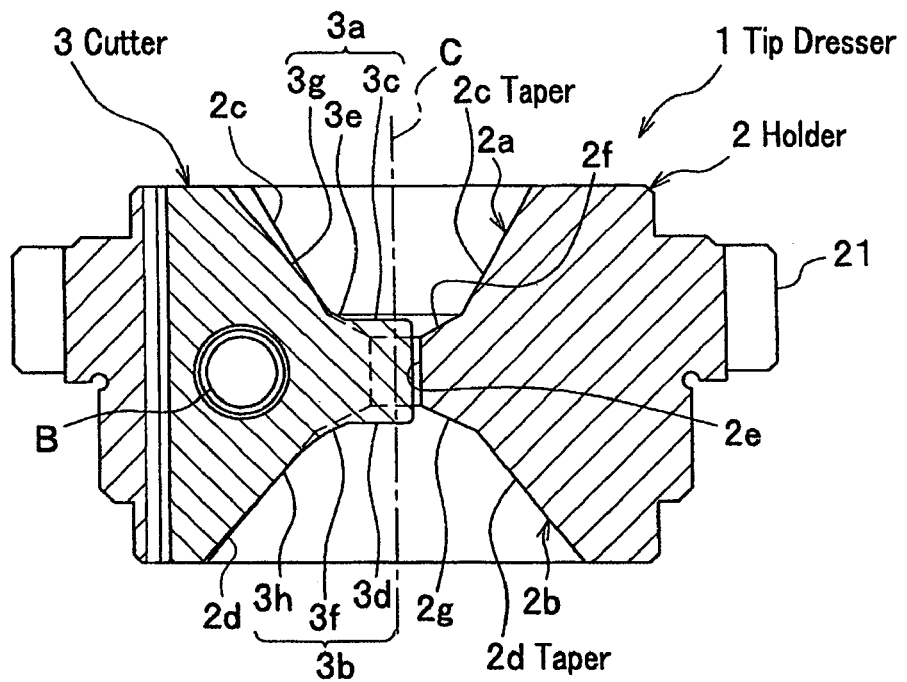
FIG. 2 is an A-A line section drawing of FIG. 1.
Figure 3:
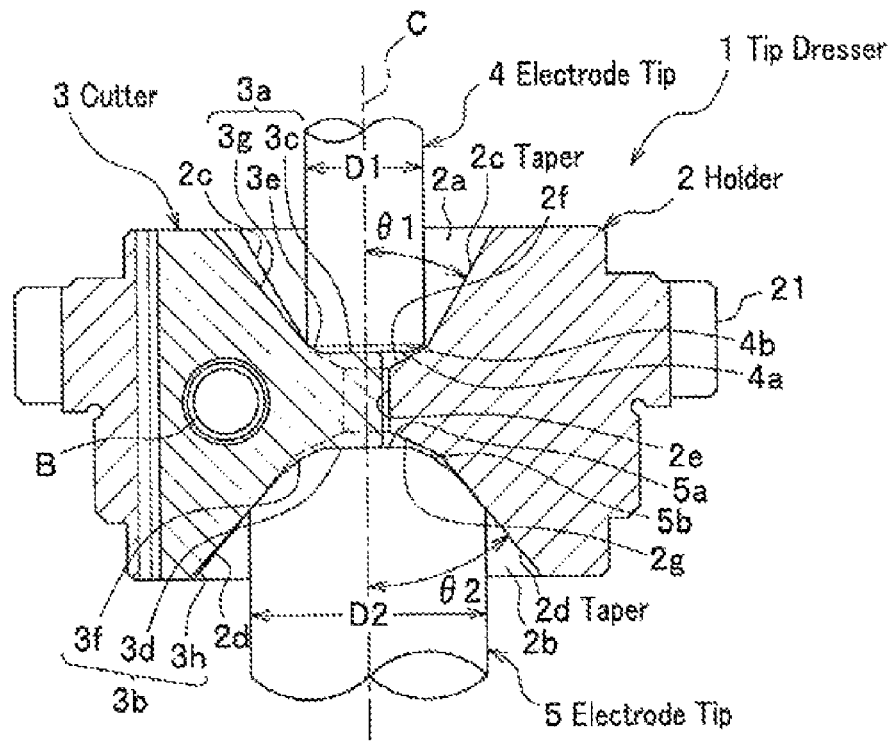
FIG. 3 is a section drawing showing a state of an electrode tip being cut by the tip dresser relating to the embodiment.
Figure 4:
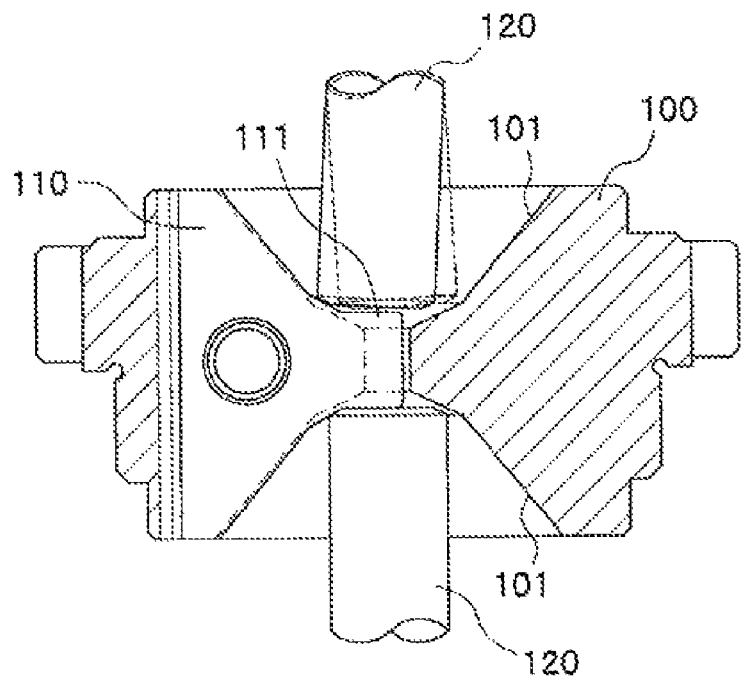
FIG. 4 is a section drawing showing a state of an electrode tip being cut by a conventional tip dresser.

Next will be described an embodiment for carrying out the present invention with reference to FIGS. 1-3. FIG. 1 is a plan view of a tip dresser relating to an embodiment of the present invention. FIG. 2 is an A-A line section drawing of FIG. 1. FIG. 3 is a section drawing showing a state of an electrode tip being cut by the tip dresser relating to the embodiment.

<<Configuration of Tip Dresser>>

A tip dresser 1 shown in FIG. 1 is an apparatus that intervenes a transmission gear (not shown), rotates a gear 21 integrated with a holder 2 by a motor (not shown) of which drive sources are compressed air, hydraulic pressure, and electricity; and cuts tops of electrode tips 4, 5 (see FIG. 3) by a cutter 3 attached to the holder 2.

<<Configuration of Holder>>

As shown in FIGS. 1 and 2, the holder 2 is a member for holding and rotating the cutter 3 and is formed into approximately a disc form. With respect to the holder 2, on an outer periphery thereof is integrally formed the gear 21; on both upper and lower faces of the holder 2 are formed bowl-like (concave taper) openings 2a, 2b having tapers 2c, 2d. The holder 2 is supported at a shaft support member (not shown) so as to be rotated around an axial center C (rotation axis) by a drive gear (not shown) engaged with the gear 21. Between the openings 2a, 2b formed on the upper and lower faces is bored a hole 2e for discharging cut powders in cutting and for attaching the cutter 3.

In addition, as kinds of the holder 2, there exist, as shown in FIG. 3, a kind of the holder 2 according to diameters depending on a difference of outer diameters D1, D2 of the electrode tips 4, 5; a kind of the holder 2 same in forms of the upper and lower faces thereof; and a kind of the holder 2 with an opening described above on one face only. The axial center C corresponds to "rotation axis" recited in "WHAT IS CLAIMED IS."

In order to guide the electrode tips 4, 5 inserted in the openings 2a, 2b toward the axial center C, the openings 2a, 2b have the tapers 2c, 2d of which inner diameters becomes smaller as the openings 2a, 2b approach the axial center C.

The tapers 2c, 2d are designed to be like a bowl that becomes deeper from an outside surface as they approach the axial center C; the center C is made a center, and in the vicinity thereof are formed gentle slopes 2f, 2g.

<<Configuration of Cutter>>

As shown in FIG. 3, the cutter 3 is, for example, a cutter for cutting and dressing the tops of the electrode tip 4 of a truncated cone (C form), and the electrode tip 5 of a dome form (D form); the cutter 3 is inserted in the hole 2e (see FIG. 1), and a back face of the cutter 3 is bumped into an inner wall of the hole 2e; and thereby the cutter 3 is positioned and fixed to the holder 2 by a bolt B. The cutter 3 consists of approximately a Y-letter-form flat plate in a side view thereof, and cutting edges 3a, 3b are formed on inner faces of the both upper and lower faces of the cutter 3.

The cutting edges 3a, 3b consist of bottoms 3c, 3d, curved portions 3e, 3f, and linear portions 3g, 3h being continuously formed. With respect to the cutting edges 3a, 3b, outside portions thereof more outside than the outer diameters D1, D2 of the electrode tips 4, 5 are formed in a retracted state of not being protruded to an axial center C side from surfaces of the tapers 2c, 2d of the holder 2; the cutting edges 3a, 3b are protrudingly formed from the surfaces of the tapers 2c, 2d only at portions more inside than the outer diameters D1, D2 of the electrode tips 4, 5. Therefore, the cutting edges 3a, 3b are adapted to be able to cut only portions of the tips 4, 5 more inside than the outer diameters D1, D2 of the tips 4, 5.

As shown in FIG. 3, the bottoms 3c, 3d of the cutter 3 are places for cutting and dressing top faces 4a, 5a of the electrode tips 4, 5, and are linearly formed in order to flatly form the faces 4a, 5a.

The curved portions 3e, 3f and the linear portions 3g, 3h are places for dressing gentle slopes 4b, 5b of the electrode tips 4, 5, and are slantingly formed into approximately a conical form (taper form).

In addition, when the electrode tips 4, 5 are cut and dressed, angles $\theta 1$, $\theta 2$ of the linear portions 3g, 3h with respect to the axial center C are preferably slanted to the center C side in order to prevent radial runout from being generated due to lessening of a centripetal force and to accurately dress the electrode tips 4, 5.

<<Configuration of Electrode Tip>>

The electrode tips 4, 5 are electrodes used for a spot welding for welding overlapped metal plates with each other, and consist of electrodes with electrode forms such as so called a DR form (dorm radius form), a DF form (dorm flat face form), a CR form (cone radius form), and a CF form (cone flat face form). In addition, even if the outer diameters D1, D2 of the electrode tips 4, 5 are different from each other, sizes of the diameters D1, D2 are not specifically limited because one cutter 3 matched with the diameters D1, D2 can be used.

<<Action>>

Next will be described an action of the tip dresser 1 relating to the embodiment of the present invention with reference to FIGS. 1-3.

Firstly, a motor (not shown) is driven, and the holder 2 and the cutter 3 are rotated. In this state, if the electrode tips 4, 5 are inserted in the openings 2a, 2b from upper and lower directions, the tips 4, 5 are guided to the axial center C side by the tapers 2c, 2d, and side ends of the top faces 4a, 5a of the tips 4, 5 are cut by the cutting edges 3a, 3b.

Cut powders cut by the cutting edges 3a, 3b advances orthogonally to edge faces along side faces of the edges 3a, 3b, are smoothly separated in the upper and lower directions, and are discharged outside the holder 2.

When, finally, the top faces 4a, 5a of the tips 4, 5 are cut by the bottoms 3c, 3d of the cutter 3, and the cutting and dressing of the electrode tips 4, 5 are completed.

In addition, when the top faces 4a, 5a of the electrode tips 4, 5 are being cut by the cutter 3, even if the tips 4, 5 are swung outside, the edge faces of the cutter 3 of the portions more outside than the outer diameters D1, D2 of the tips 4, 5 are not protruded to tips 4, 5 sides from the tapers 2c, 2d, the gentle conical slopes 4b, 5b are not excessively cut. Then only the edge faces of the cutter 3 of the portions more inside than the outer diameters D1, D2 of the electrode tips 4, 5 are protruded to the tips 4, 5 sides from the tapers 2c, 2d, and the tips 4, 5 are cut at this place.

At this time, because the portions of the cutting edges 3a, 3b more outside than the outer diameters D1, D2 of the electrode tips 4, 5 are guided by the tapers 2c, 2d of the holder 2, which are protruded to the axial center C side from the edges 3a, 3b, so that the tips 4, 5 return to the direction of the center C, the radial runout of the tips 4, 5 can be suppressed.

Furthermore, the holder 2 and the cutting edges 3a, 3b of the cutter 3 are different in the diameters of the both upper and lower faces of the edges 3a, 3b, and thereby, two different electrode tips 4, 5 can be cut and dressed in common by one holder 2.

In addition, it goes without saying that: the present invention is not limited to the embodiment; various modifications and changes thereof are enabled within the spirit and scope of the invention; and the invention also covers the modified and changed inventions.

What is claimed is:

1. A tip dresser for dressing an electrode tip comprising:
   a rotatable holder configured to be rotated around a rotation axis thereof and having two concave tapers formed respectively on upper and lower faces of the holder, the concave tapers being coaxial with the rotation axis of the holder; and
   a cutter fixed to the holder and rotatable therewith, the cutter including a cutting portion having a linear cutting edge that is slanted with respect to the rotation axis and also having a transverse cutting edge, which cutting portion projects into a space within the concave tapers and will engage the electrode tip when the electrode tip is inserted into one of the concave tapers such that the transverse cutting edge engages a terminal end face of the electrode tip and the linear cutting edge engages a peripheral side surface of the electrode tip that is closer to the rotation axis than is an electrode tip outer diameter surface that is adjacent to the peripheral side surface; and wherein the cutter is positioned on the holder based on a size of the electrode tip to be dressed such that when the electrode tip is inserted into one of the concave tapers coaxially with the rotation axis of the holder, the cutting portion of the cutter will protrude closer to the rotation axis than does the surface of the one concave taper only where the cutting portion is disposed at a distance less than a radius of the electrode tip from the rotation axis such that the linear cutting edge intersects the one concave taper, and radial swinging movement of the electrode tip relative to the rotation axis of the holder will be suppressed by engagement of the electrode tip with the surface of the one concave taper.

* * * * *